C. B. SCHOENMEHL.
BATTERY ELEMENT SUPPORT.
APPLICATION FILED NOV. 30, 1908.
922,731.
Patented May 25, 1909.
2 SHEETS—SHEET 1.
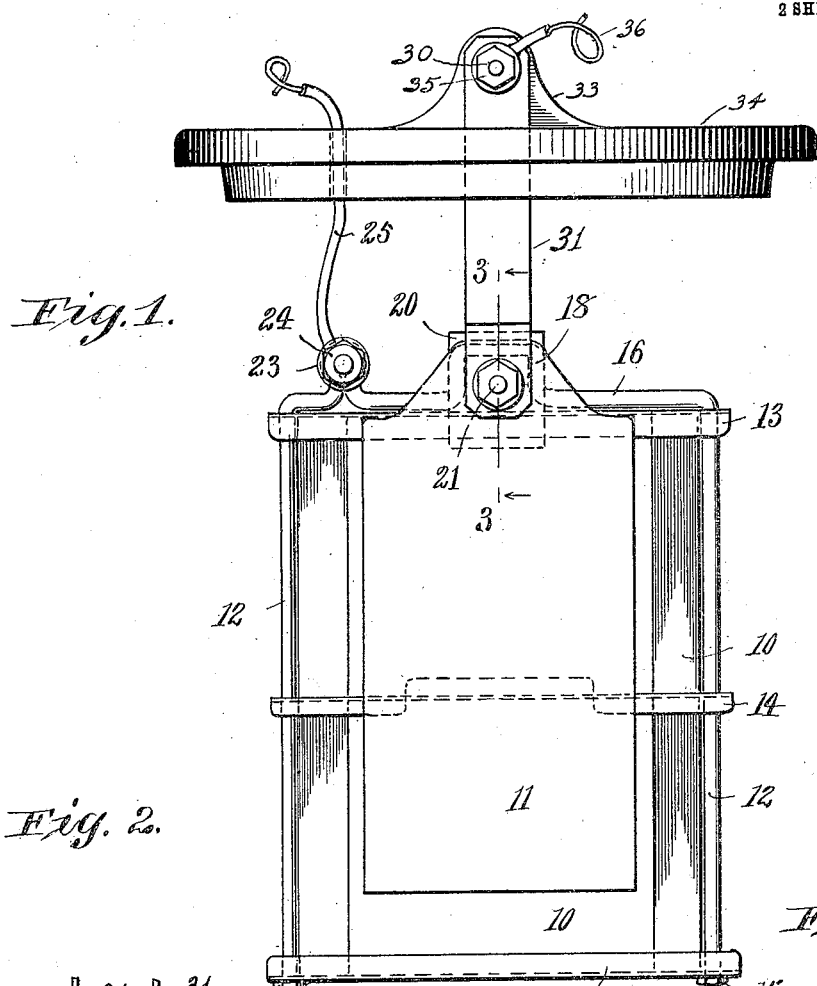
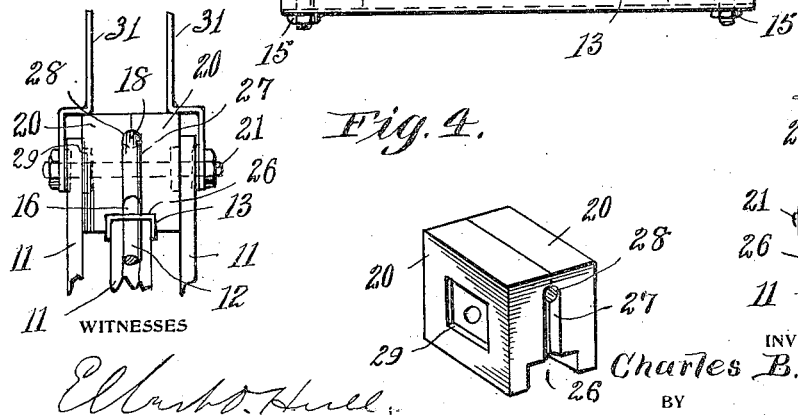
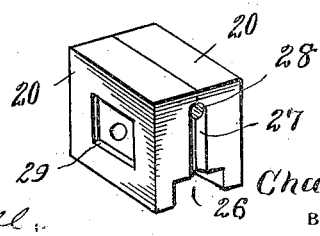
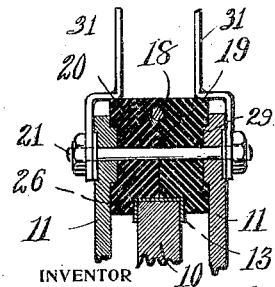
WITNESSES
INVENTOR
Charles B. Schoenmehl
BY
Chamberlain & Newman
ATTORNEYS C. B. SCHOENMEHL.
BATTERY ELEMENT SUPPORT.
APPLICATION FILED NOV. 30, 1908.
922,731.
Patented May 25, 1909.
2 SHEETS—SHEET 2.
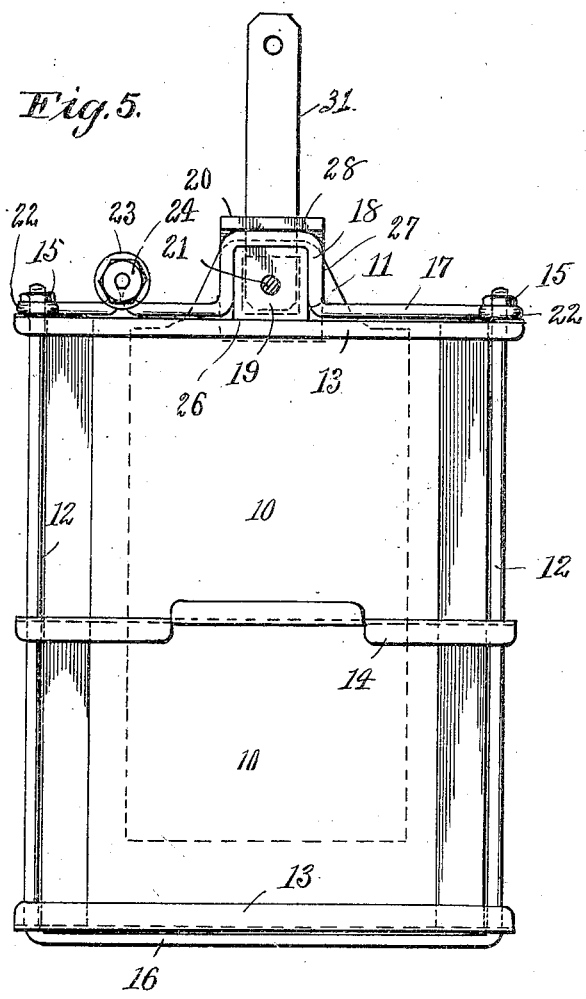
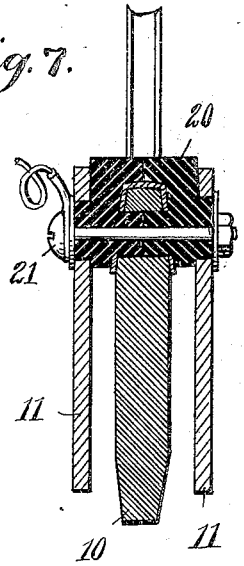
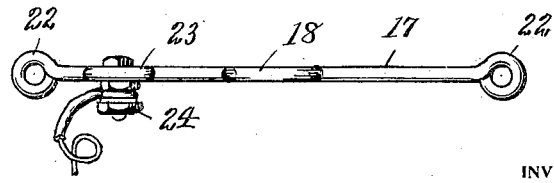
WITNESSES
INVENTOR
Charles B. Schoenmehl
BY
Chamberlain + Newman
ATTORNEYS

UNITED STATES PATENT OFFICE.

CHARLES B. SCHOENMEHL, OF WATERBURY, CONNECTICUT.

BATTERY-ELEMENT SUPPORT.

No. 922,731.  Specification of Letters Patent.  Patented May 25, 1909.

Application filed November 30, 1908. Serial No. 465,036.

*To all whom it may concern:*

Be it known that I, CHARLES B. SCHOENMEHL, a citizen of the United States, and resident of Waterbury, in the county of New Haven and State of Connecticut, have invented certain new and useful Improvements in Battery-Element Supports, of which the following is a specification.

My invention relates to the class of voltaic batteries which employ a compressed copper oxid plate as a negative electrode and a suitable zinc plate as a positive element.

The invention particularly refers to means, such as a metal frame for suspending the said positive and negative plates from a battery cover within a jar so as to conveniently adapt them for use when submerged within a solution contained within such a jar.

It is the purpose of my invention to improve in several particulars upon supporting frames for elements of this kind, namely, first by providing integral means for the attachment of the field wires to the frame; second to provide precautionary means to prevent short circuiting of the elements, one with the other when in use, and further to construct the device so that the zinc plates may be rigidly and firmly, but insulatively connected to the copper plates and in a manner that will prevent one from contacting with the other.

Upon the accompanying two sheets of drawings forming a part of this specification similar characters of reference denote like or corresponding parts throughout the several figures and of which, Figure 1, shows a side elevation of my improved battery element supporting frame attached to a commercial type of cover ready to be set into a battery jar. Fig. 2, is a detached edge view of a part of the supporting frame and connected elements, as seen from the right of Fig. 1. Fig. 3, is a central vertical cross section taken on line 3—3 of Fig. 1. Fig. 4, is a detached perspective view of the insulating blocks used intermediate of the negative and positive plate electrodes. Fig. 5, is a side elevation of a modified form of supporting frame with one of the zinc plates removed. Fig. 6, is a detached plan view of a wire yoke forming a part of the modified form of frame shown in Fig. 5, and Fig. 7, is a central vertical sectional view somewhat similar to Fig. 3, though illustrating a different construction of frame, but with substantially the same sort of insulating blocks as used in the other figures of the drawing.

Referring in detail to the characters of reference marked upon the drawings 10 represents compressed oxid of copper plates constituting the negative electrodes, and of which there may be one or more, arranged above each other. The negative plate electrodes may be of the usual or any preferred shape but adapted to be arranged within my improved frame, and to which the usual zinc or positive plate electrodes 11 are attached on either side, and opposite to the faces of the negative plates.

My supporting frame is preferably formed of wire and sheet metal combined, and comprises parallel side wires 12—12 upon which the top and bottom channel cross pieces 13 are mounted. When two negative plates are used as shown in Figs. 1 and 5, an additional intermediate cross piece 14 is also used to support the lower part of the upper plate and the upper edge of the lower plate. The negative plates are supported intermediate these cross pieces and side wires by means of nuts 15 attached to the threaded ends of the side wires as shown. These side wires are connected together by a transverse portion 16 disposed against the bottom cross pieces as shown in Fig. 5, forming a U shaped wire frame portion and having the clamping nuts 15 attached to the upper ends, or said sides may be connected across the top as seen in Figs. 1, 2, and 3, and in which instance the clamping nuts 15 would be applied to the bottom. Intermediate of the top wire cross portion 16 of the wire frame, or in the cross yoke 17 if employed, I form an upwardly disposed loop 18 the wire side portions of which are disposed upward at a right angle to the cross member and parallel with each other, while the top part of the loop is straight across and parallel to the top channel cross piece 13, thereby forming a square opening therethrough as shown in Fig. 5, for the reception of a correspondingly shaped lug 19 upon the inner faces of the insulating blocks 20. This loop obviously constitutes a part of the frame and is extended above the main part thereof in a way to rigidly support the insulating blocks in true alinement with the frame, and so that when the zinc plates are attached against the blocks, they will be rigidly supported and the lower ends prevented from swinging against the sides of the negative electrode. The blocks are both firmly clamped in position by the bolt 21 and its nut together with the nuts 15 before mentioned upon the ends of the wire frame. In this respect it will be seen that the result is about the same if the wire part of the frame be formed of one piece as shown in Fig. 1, or of two pieces as shown in Figs. 5 and 7. In the latter case it will be seen that a U shaped wire frame is employed together with a wire yoke 17 having eyes 22 formed in its end portions to receive the threaded ends of the side wires. I also form in the top part of the frame by the further bending of the wire an integral eye 23 to which a suitable binding screw 24 is connected for the attachment of the field wire 25.

The blocks 20 are alike in construction as will be seen from Figs. 3, 4 and 5, and are shaped to fit up against the opposite sides of the intermediate top part of the frame and plate when assembled, in a way to entirely inclose the uppermost part of the frame by the said blocks meeting flush against each other across the top. This construction prevents any sediment which may form upon the top surface of the insulating blocks from short circuiting the elements, as might be the case were the top part of loop 17 in the frame exposed. Consistent with the above objects each of the above blocks are cut away across the bottom as at 26 to receive the channel strip 13, and also cut away along each inner side edge as at 27 to intersect with the upper transverse groove 28 which joint recesses in the blocks obviously serve to receive and accommodate the loop portion of the frame.

The outer side face of each block contains a square recess 29 to receive a correspondingly shaped shoulder upon the inner face of the zinc plates 11, and whereby the zincs are held in place against edgewise movement when secured in plate by the bolt 21 when secured therethrough. This bolt also serves the further purpose of electrically connecting the two zincs which in practice constitute one side or element of the battery, and are further obviously insulated from the negative element by the blocks before mentioned.

31 represents hangers the lower ends of which are connected against the side of the zinc plates by means of the bolt 21 before mentioned, while the upper ends are provided with a hole through which a bolt 30 is passed for the connection of the hangers to a lug 33 of the cover 34. A binding nut 35 attached to this bolt also serves for the attachment of the field wire 36 as shown in Fig. 1. In this connection it will also be seen that the frame and electrodes carried therein are supported by this bolt and may readily be connected or disconnected by means thereof.

Having thus described my invention what I claim and desire to secure by Letters Patent is:—

1. An electrode support for batteries comprising a frame including in part a wire top cross piece having its intermediate portion bent up and around to form an integral eye for the attachment of a binding post.

2. In an electrode support for batteries, the combination with the other parts of a supporting frame including in part side wires, a top cross yoke formed of wire and having eyes in its end portions to engage the side wires, and an integral eye formed by the bending of the wire intermediate thereof for the attachment of a binding post.

3. An electrode support for batteries, comprising a pair of parallel guide wires, two or more transverse channel sheet metal strips mounted upon the wires, a wire yoke having eyes in its ends to receive the ends of the side wires, and nuts to engage the threaded ends of said wires for the attachment of the yoke.

4. In an electrode support for batteries, the combination with the other parts of a frame, of a transverse top piece, a negative element carried by the same, insulating blocks attached to and inclosing the intermediate portion of the top piece, and zinc plates secured to the opposite sides of said blocks.

5. In an electrode support for batteries, the combination with a frame, of insulating blocks for attachment thereto having an inclosed hole therethrough for the reception of a part of the frame, a second hole through the said insulating blocks at a right angle to the first said hole, a bolt passing through the latter hole, and zincs connected to the faces by the blocks of the said bolt.

6. In an electrode support for batteries, the combination with a frame, of a pair of insulating blocks substantially alike in construction and each shaped to receive a portion of the frame to insure the said blocks fitting up flush against each other at points not engaged by the frame and particularly above the said frame and intermediate of the opposite zinc elements.

7. In an electrode support for batteries, the combination with a frame, of a transverse wire top portion having a loop formed therein with its intermediate portion disposed upward at a right angle to form vertically disposed side braces, insulating blocks recessed to fit against the sides of the frame including the said braces, and means for clamping the blocks against the said parts so as to retain them firmly together and in alinement with the rest of the frame.

Signed at Bridgeport in the county of Fairfield and State of Connecticut, this 28th day of Novemebr, A. D., 1908.

CHARLES B. SCHOENMEHL.

Witnesses:
C. M. NEWMAN,
V. HALL ROOT.